(No Model.) 2 Sheets—Sheet 1.
J. L. MAJOLA.
GUARD FOR TREES, &c.
No. 494,874. Patented Apr. 4, 1893.
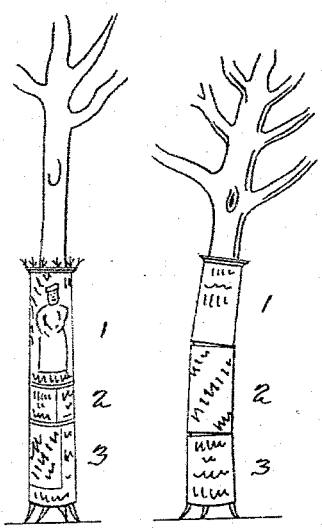
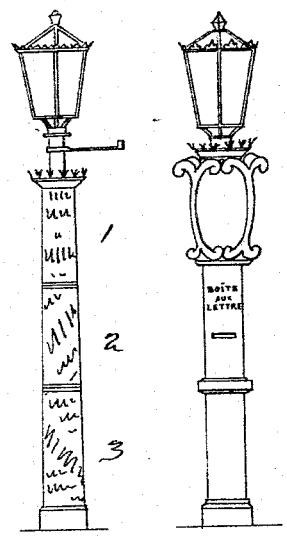
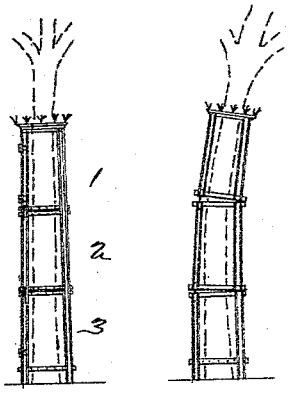
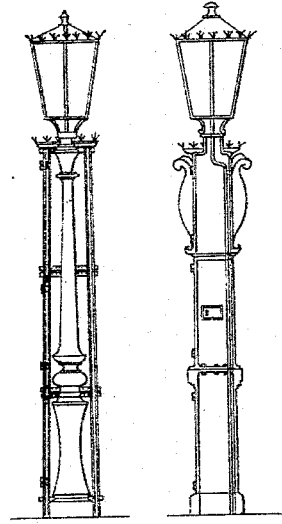
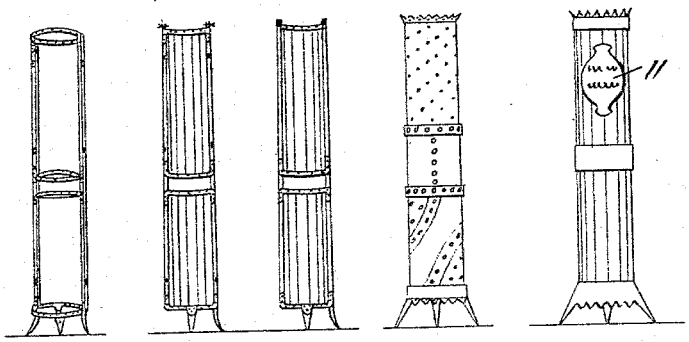
Witnesses:
E. B. Bolton
S. J. Jones
Inventor:
Joseph L. Majola
By
his Attorneys.

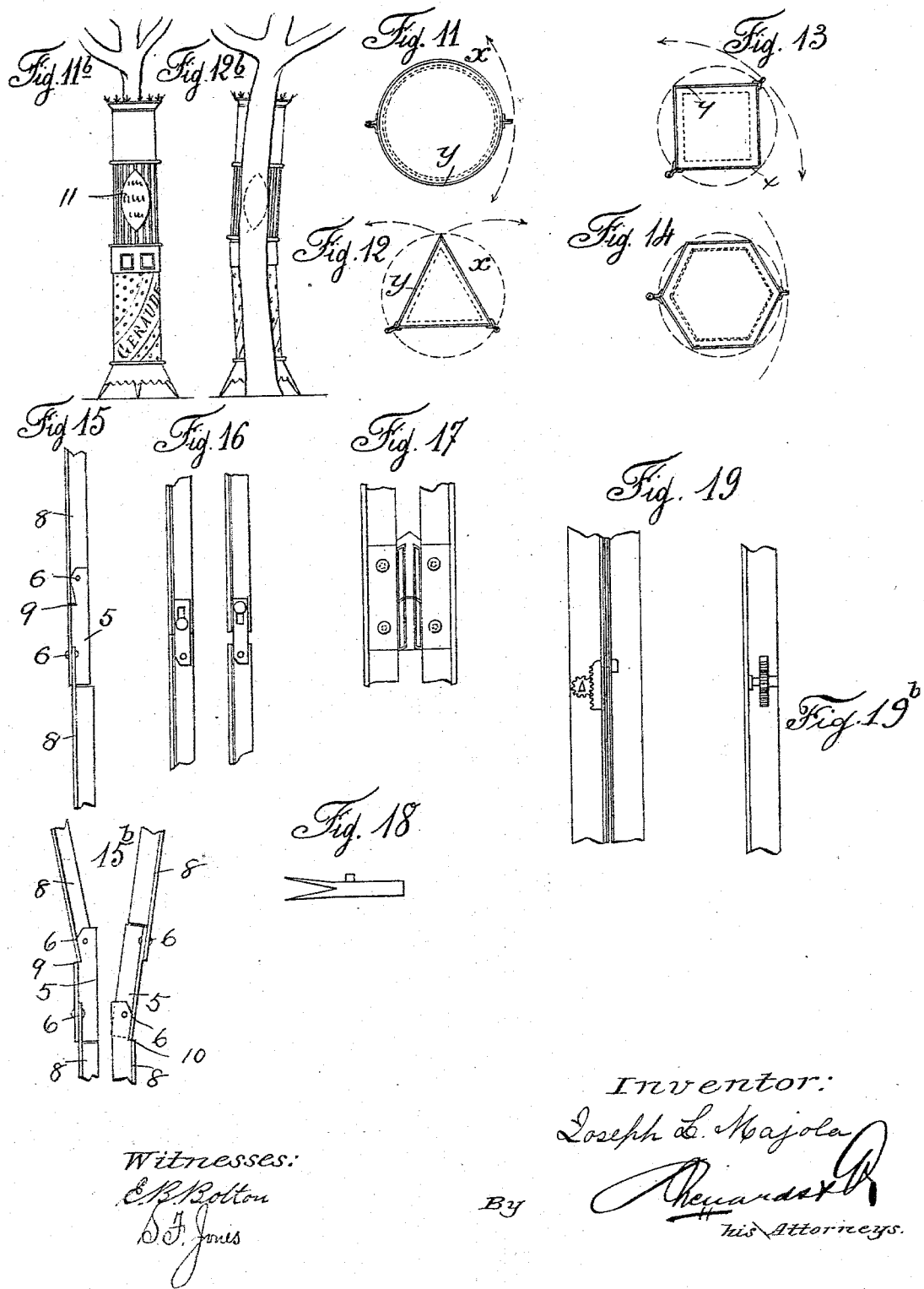

UNITED STATES PATENT OFFICE.

JOSEPH L. MAJOLA, OF ST. ETIENNE, FRANCE.

GUARD FOR TREES, &c.

SPECIFICATION forming part of Letters Patent No. 494,874, dated April 4, 1893.

Application filed April 4, 1892. Serial No. 427,694. (No model.) Patented in France June 25, 1891, No. 214,419.

*To all whom it may concern:*

Be it known that I, JOSEPH L. MAJOLA, a citizen of France, residing at St. Etienne, (Loire,) France, have invented a Guard to be Applied to the Trunks of Trees, Lantern-Posts, Telegraph-Poles, &c., (for which I have received French Letters Patent No. 214,419, dated June 25, 1891,) of which the following is a specification.

It is the object of my invention to provide a tree guard of a flexible and sectional character which will also be of sufficient strength and rigidity to afford an effective guard for the tree. It is also my purpose to provide such a guard as will be adapted to receive advertising matter.

In the drawings: Figure 1, is a side elevation of my guard, as applied to a tree. Fig. 2, is a similar view of the guard as adapted to a bent tree. Figs. 3 and 4, show the guard as applied to a lamp post. Figs. 5 and 6, are modifications in side elevation. Fig. 7, shows this form applied to a lamp post. Fig. 8 is a modified form. Figs. 9, $9^b$, 10, $10^b$, $11^b$ and $12^b$ are further views of modified forms. Figs. 11, 12, 13 and 14 are plan views of different forms of guards. Figs. 15, $15^b$, 16, and 17 are views of different means of attaching the sections of the guard together. Figs. 18, 19, $19^b$ are views of the locking device.

The guard is made of sections 1, 2, and 3, formed tubular or in any other cross sectional shape, as shown in Figs. 11, 12, 13, and 14. The sections may be of skeleton form as shown in Figs. 5 and 6, to provide an open frame work. They may be used for advertising purposes as shown in Figs. 1, 2, 3, 4, $10^b$ and $11^b$, and removable panels 11 are provided for this purpose. Each section is formed in two or more parts, $x$, $y$, as shown in the plan views hinged or connected together vertically, so that they may be opened or folded about the tree.

By thus providing a guard formed of sections, adapted to be placed one on the other and each separately removable the guard may be adapted to any height of tree and may be readily fitted thereto, or removed. The sections are free to have lateral play in relation to each other and thus they will adapt themselves to a bent tree as shown in Figs. 2, 6 and $12^b$. I prefer to connect the sections together with means which will permit them to be adjusted laterally in relation to each other and such means is shown in Figs. 15 and $15^b$, in which the links 5 are used, which are pivoted at points 6, 6, to the rails 8 of the sections, the link having a notch 9, and the lower rail a notch 10 which will permit a certain amount of movement of the parts before they become rigidly engaged with each other. A modification of this link connection is shown in Fig. 16. When the sections of the guard are closed or wrapped about the tree, the parts $x$, $y$, are held by any suitable lock, as illustrated in Figs. 18, 19, and $19^b$. The space within the guard may be utilized for telephones or for any other purpose desired.

I claim—

1. A tree protector consisting of a series of non-flexible sections divided from each other horizontally, each section being divided vertically and having means for holding the parts together and the additional securing means between the sections at their horizontal edges said securing means being of a flexible nature to permit flexure of the tree guard throughout its vertical extent.

2. A tree guard consisting of a series of sections, and the pivoted links 5 for connecting said sections together, substantially as described.

In testimony that I claim the foregoing I have hereunto set my hand this 16th day of March, 1892.

JOSEPH L. MAJOLA.

Witnesses:
   VICTOR MATRAY
   FREDERIC MATRAY.